(12) United States Patent
Sami et al.

(10) Patent No.: US 10,140,539 B2
(45) Date of Patent: Nov. 27, 2018

(54) CALIBRATION DEVICE FOR CAMERA-FINGER—OFFSET

(71) Applicant: OptoFidelity Oy, Tampere (FI)

(72) Inventors: Laine Sami, Tampere (FI); Hans Kuosmanen, Tampere (FI); Kimmo Jokinen, Tampere (FI)

(73) Assignee: OPTOFIDELITY OY, Tampere (FI)

( * ) Notice: Subject to any disclaimer, the term of this patent is extended or adjusted under 35 U.S.C. 154(b) by 90 days.

(21) Appl. No.: 15/273,964

(22) Filed: Sep. 23, 2016

(65) Prior Publication Data

US 2018/0089522 A1    Mar. 29, 2018

(51) Int. Cl.
| | |
|---|---|
| G06K 9/32 | (2006.01) |
| G06T 7/00 | (2017.01) |
| G06K 19/06 | (2006.01) |
| G06K 9/00 | (2006.01) |
| G06F 3/041 | (2006.01) |
| G06F 3/042 | (2006.01) |

(52) U.S. Cl.
CPC ..... *G06K 9/3216* (2013.01); *G06K 19/06037* (2013.01); *G06T 7/0018* (2013.01); *G06T 7/0044* (2013.01); *G06T 7/0085* (2013.01); *G06F 3/0418* (2013.01); *G06F 3/0425* (2013.01); *G06K 2009/3225* (2013.01); *G06T 2207/10024* (2013.01); *G06T 2207/30204* (2013.01); *G06T 2207/30244* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0201575 | A1* | 10/2004 | Morrison | G06F 3/0428 345/173 |
| 2008/0165360 | A1* | 7/2008 | Johnston | A61B 1/00057 356/394 |
| 2012/0188342 | A1* | 7/2012 | Gervautz | G06T 7/246 348/46 |
| 2014/0210857 | A1* | 7/2014 | Liu | G06T 19/006 345/633 |
| 2015/0369593 | A1* | 12/2015 | Myllykoski | G06T 7/73 348/136 |

\* cited by examiner

*Primary Examiner* — Michael E Teitelbaum
(74) *Attorney, Agent, or Firm* — Ziegler IP Law Group, LLC

(57) ABSTRACT

There are disclosed various methods, apparatuses and computer program products for camera assisted alignment detection. In some embodiments a certain number of patterns are shown on a display of a device under test, at least one image of the display is captured, the at least one captured image is analyzed to find out locations of the patterns, and the locations of the patterns are used to determine the pose of the device under test.

14 Claims, 5 Drawing Sheets

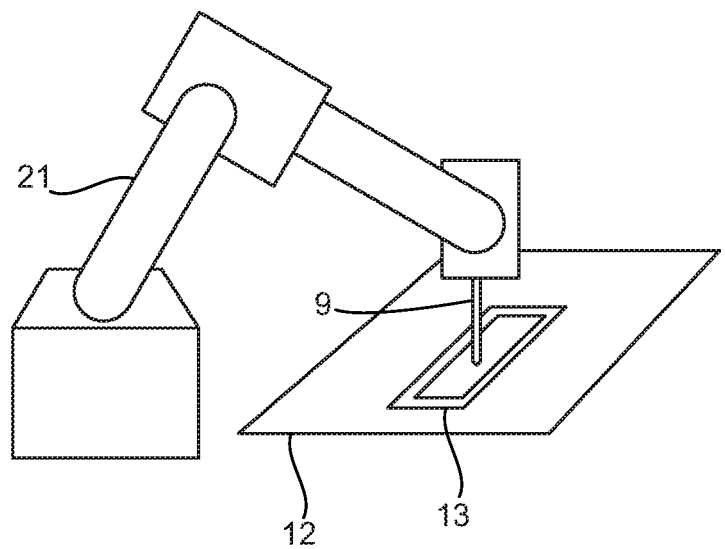
Fig. 6
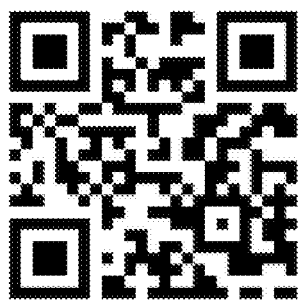  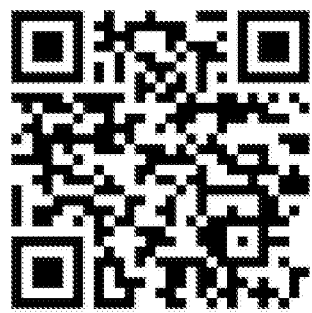
Fig. 7a  Fig. 7b  Fig. 7c

CALIBRATION DEVICE FOR CAMERA-FINGER—OFFSET

TECHNICAL FIELD

The present invention relates to a method for camera assisted alignment detection and camera assisted positioning apparatus. The invention also relates to a computer program product for camera assisted alignment detection. The present invention further relates to a method for calibrating the camera assisted alignment detection apparatus and a computer program product for calibrating the camera assisted alignment detection apparatus.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Apparatuses and methods have been developed for testing devices having a display without opening the device or connecting any measuring equipment to the device. Such apparatuses may comprise a testing probe having a touch pin (also known as a stylus), which may be used to imitate a finger of a user of a device under test (DUT). Hence, such a touch pin may also be called as a testing finger. The testing probe may be moved by a robotic arm to different locations and the touch pin may be moved to touch a surface or a key of the device under test, wherein different kinds of touches to the device under test may be simulated. For example, the touch pin may simulate presses of keys of the device, touches on a touch panel of the device, different kinds of gestures on the touch panel etc.

Testing probes may also have a camera which may be used to detect locations where the touching finger should touch the device under test and to capture images of the device to analyze responses of the device to the touches. For example, when a display under the touch panel displays keys of a keyboard and the touching finger should touch a certain key displayed on the screen, the camera may capture an image of the display and a controller of the testing device may analyze the image to find out the location of the key on the display. Then, the controller may provide instructions to the robotic arm to move the testing probe to a location where the touch pin is above the location on the touch panel where that key is shown and instruct the robotic arm to move the touch pin on the surface of the touch panel and retract the touch pin from the surface of the touch panel. This operation effects that the device under test should react to the touch as if a human being were touching the touch panel. The camera may also be used to capture images of the display after the touch has been performed to find out the actual response of the device to the touch.

When a device under test is located to a test bench or other substrate for testing the device, the actual location of the device may not be accurately known. In some situations a kind of a jig may be used which may help alignment of the device but in some other situations such a jig may not be available or it is not used for some other reason. For example, different devices might require different kinds of jigs which may increase testing costs.

To be able to deduce the actual location of the device under test some kind of location determination may be needed.

Therefore, there is a need to find a method, system and apparatus for determining a location of the device under test with respect to a testing probe.

SUMMARY

One aim of the present invention is to provide a method, apparatus and computer program product for camera assisted alignment detection. Alignment detection means in this context e.g. figuring out the actual location of a testing probe with respect to the device under test or with respect to a certain part of the device such as a display.

Some embodiments provide a method for camera assisted alignment detection. In some embodiments a certain number of patterns are shown on a display of a device under test, at least one image of the display is captured, the at least one captured image is analyzed to find out locations of the patterns, and the locations of the patterns are used to determine the pose of the device under test.

Various aspects of examples of the invention are provided in the detailed description.

According to a first aspect, there is provided a method for testing a device, the method comprising:

instructing the device to display at least one pattern on a display of the device;

capturing at least one image of the display;

examining the captured image to find out a location of the at least one pattern;

utilizing information on the location of the at least one pattern to determine a pose of the device.

According to a second aspect, there is provided an apparatus for testing a device, the apparatus comprising at least one processor; and at least one memory including computer program code the at least one memory and the computer program code configured to, with the at least one processor, cause the apparatus to perform at least the following:

instruct the device to display at least one pattern on a display of the device;

capture at least one image of the display;

examine the captured image to find out a location of the at least one pattern;

utilize information on the location of the at least one pattern to determine a pose of the device.

According to a third aspect, there is provided a computer readable storage medium stored with code thereon for use by an apparatus, which when executed by a processor, causes the apparatus to perform:

instruct a device under test to display at least one pattern on a display of the device;

capture at least one image of the display;

examine the captured image to find out a location of the at least one pattern;

utilize information on the location of the at least one pattern to determine a pose of the device.

Some advantages may be achieved by the present invention. For example, an example setup may allow more reliable positioning of the testing probe. It may also be possible to obtain more automatic positioning system because some embodiments of the present invention may provide more information than only information to be used in determination of the location of the testing probe and/or the camera attached with the testing probe with respect to the device under test.

The device under test may be, for example, a mobile phone, a tablet computer, a working plane of a robot, a tool, a piece of paper, some other object to be visually analyzed, etc.

BRIEF DESCRIPTION OF THE DRAWINGS

For a more complete understanding of example embodiments of the present invention, reference is now made to the following descriptions taken in connection with the accompanying drawings in which:

FIG. 6 illustrates a conceptual setup of a testing apparatus according to an example embodiment;

FIGS. 7a to 7c show some non-limiting examples of QR codes; and

DETAILED DESCRIPTION OF SOME EXAMPLE EMBODIMENTS

Figure 1:
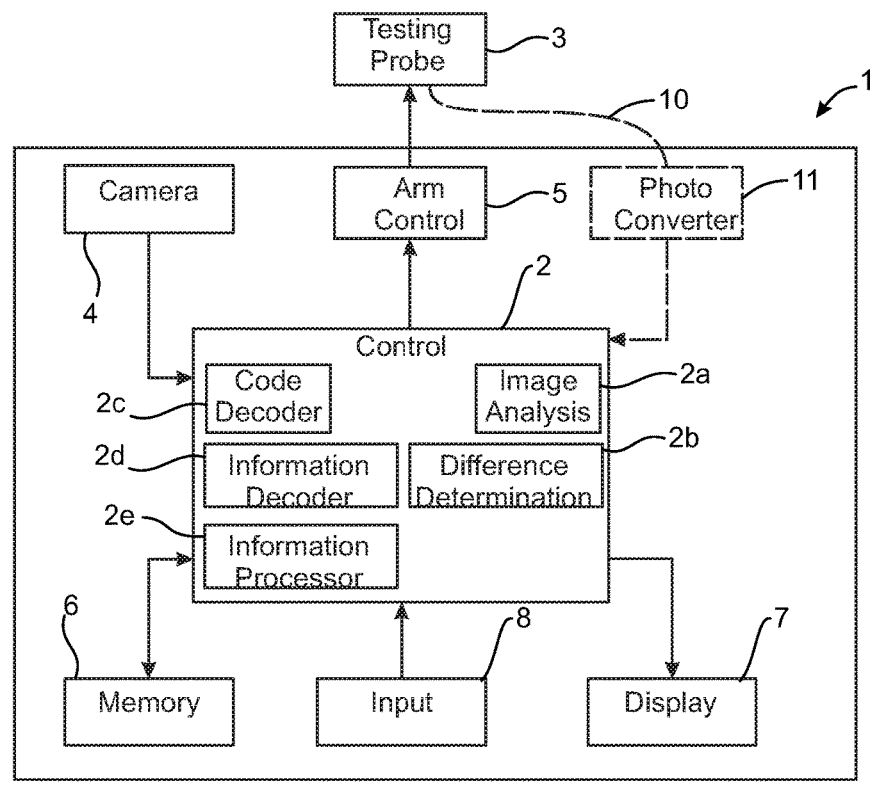
FIG. 1 is a simplified block diagram of a testing apparatus according to an example embodiment.
Figure 5:
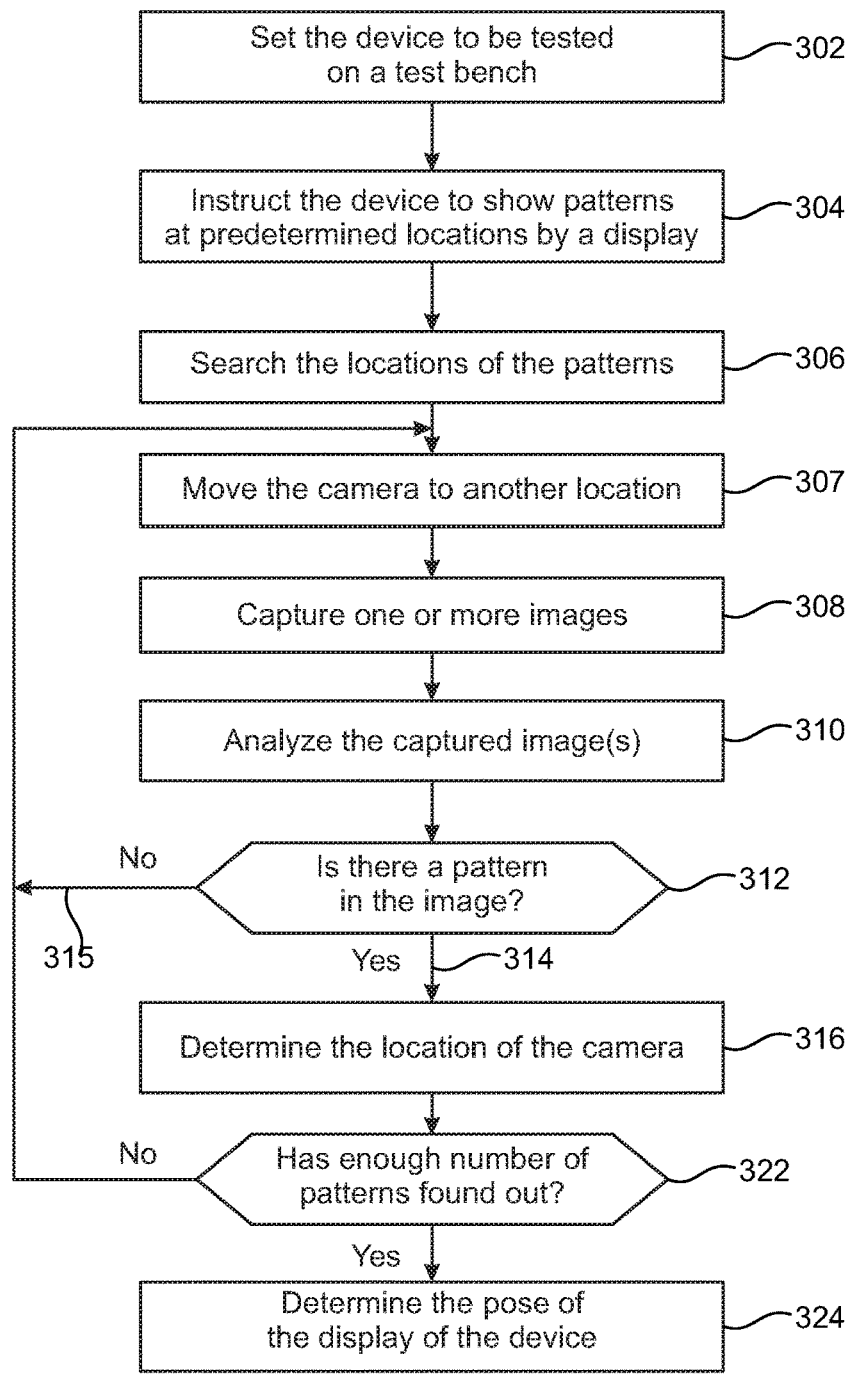
FIG. 5 shows a flow diagram of a method according to an example embodiment.

In the following some example embodiments will be described. FIG. 1 is a simplified block diagram of a testing apparatus 1 according to an example embodiment of the present invention and FIG. 5 is a flow diagram of a method according to an example embodiment of the present invention. The testing apparatus 1 comprises a control block 2, which is adapted to control the operation of the testing apparatus 1. The testing apparatus 1 also comprises a testing probe 3, which comprises a touch pin 9 intended to simulate touches on a device under test (not shown in FIG. 1), and a camera 4 intended to capture images during calibrating the testing probe 3 and during testing the device under test. The testing probe 3 may also be called as a testing finger or a stylus, for example. Movements of the testing probe 3 may be achieved by a robotic arm 21 (FIG. 6). The testing apparatus 1 may comprise an arm controller 5 which may provide signals to motors or other corresponding elements of the robotic arm 21 so that the testing probe 3 can be moved as desired. The robotic arm 21 may have two, three or more degrees of freedom. In accordance with an embodiment, the robotic arm 21 has six degrees of freedom, wherein the testing probe 3 is free to move forward/backward, up/down, left/right in three perpendicular axes and also rotate about three perpendicular axes. These movements may be called as pitch, yaw, and roll. Hence, to achieve six degrees of freedom, the arm controller 5 may provide six signals to the motors (not shown) of the robotic arm 21. The testing apparatus 1 may further comprise memory 6 for storing data and/or computer code for operating the testing apparatus 1, a display 7 for displaying information to a user of the testing apparatus 1, and input means 8 such as a keyboard, a pointing device, etc. for receiving instructions from the user.

The control block 2 may comprise an image analyzer 2a for analyzing the images and a position determinator 2b. The image analyzer 2a and the position determinator 2b may be implemented e.g. as a computer code, by hardware or both.

Figure 2A:
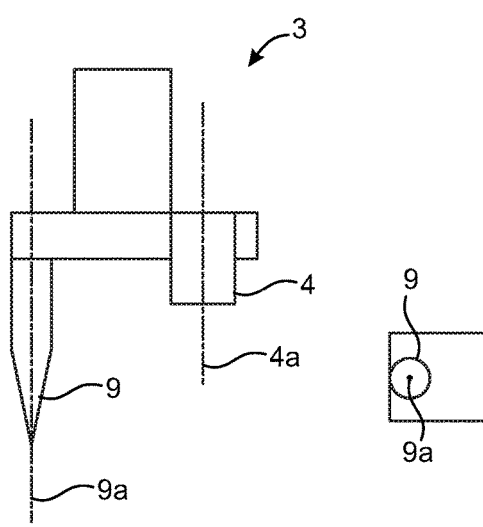
FIG. 2a is a conceptual drawing of a testing probe as a side view according to an example embodiment.
Figure 2B:
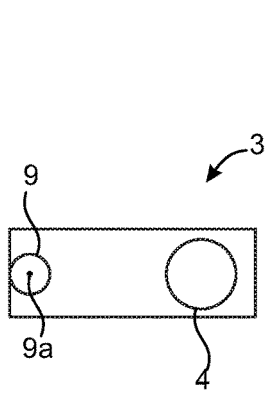
FIG. 2b is a conceptual drawing of the testing probe as a bottom view according to an example embodiment.

FIG. 2a is a conceptual drawing of the testing probe 3 as a side view according to an example embodiment and FIG. 2b is a conceptual drawing of the testing probe 3 as a bottom view. In this embodiment the testing probe 3 and the camera 4 of the testing probe 3 are not coaxially aligned, wherein there is an offset 15 between a centerline 9a of the touch pin 9 and a centerline 4a of the camera 4. In other words, the touch pin 9 and the camera 4 do not share the same centerline. The offset may be one-dimensional or two-dimensional. In the following, it is assumed that the offset is two-dimensional having both an x-component (x-offset) and a y-component (y-offset). In some embodiments the offset may even have a third component (z-component, depth or height). It should be noted here that the offset between the camera 4 and the touch pin 9 are known by the control block 2, but it may also be possible to perform a calibration procedure to find out the actual offset.

Figure 2C:
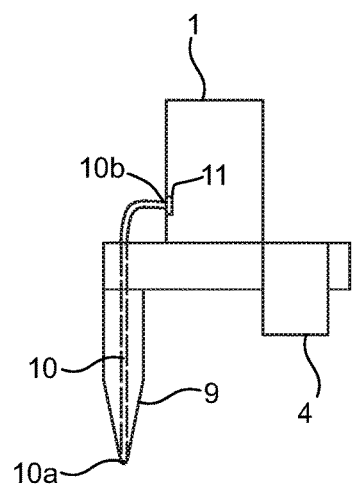
FIG. 2c is a conceptual drawing of a testing probe as a side view according to another example embodiment.

FIG. 2c illustrates another kind of testing probe 3. In this embodiment a first end 10a of an optical fiber 10 or a bunch of optical fibers 10 has been inserted through the touch pin 9, preferably in the middle of the touch pin 9. Therefore, the first end 10a of the optical fiber(s) 10 move(s) together with the touch pin 9. Another end 10b of the optical fiber 10 or the bunch of optical fibers 10 is located in front of an opto-electric converter 11, such as a photo diode or an image sensor. When there is only one or a few fibers 10 the photo diode may suffice to provide indication of illumination received by the first end of the optical fiber 10. In case of the bundle of the optical fibers 10 the image sensor may be used as the opto-electric converter 11 to be able to produce information of an image received by the first ends 10a of the optical fibers 10 of the bundle. The operation of the testing probe 3 of FIG. 2c will be described later in this specification.

Figure 3:
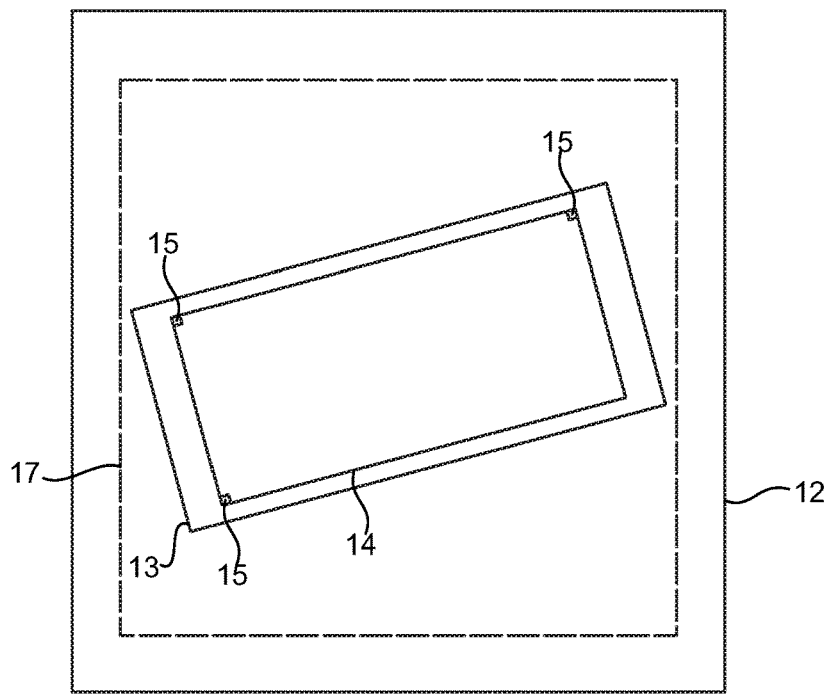
FIG. 3 depicts an example of a setup for testing a device.

In the following, an embodiment of a camera assisted alignment detection will be described in more detail with reference to the testing setup depicted in FIG. 3 and the flow diagram of FIG. 5. It is also assumed that the testing probe 3 comprises the touch pin 9 and the camera 4 having an offset between them. The device 13 to be tested is set 302 on a test bench 12. It is assumed here that it is not necessary to accurately put the device 13 in a certain location but it may be sufficient that the device is within a certain area. The dotted line 17 in FIG. 3 illustrates an example of such area. The device 13 may then be instructed 304 to show certain pattern 15 at predefined locations by a display 14 of the device 13. According to a first example, the pattern is a dot and it is displayed at least on three corners of the display 14 as is illustrated in FIG. 3. However, it should be noted here and as will be explained later, the number of patterns to be displayed may be different from three, such as one, two or more than three. The testing apparatus is instructed to search 306 the locations of the patterns 15. This may be performed, for example, so that the control block 2 instructs the arm controller 5 to move 307 the robotic arm 21 within the area 17. While the robotic arm 21 is moved the camera 4 captures 308 images. The image analyzer 2a may analyze 310 the captured images and determine 312 whether an image shows the pattern 15 or not. If the pattern 15 has been detected 314, the location of the robotic arm 21 is determined 316. Hence, the determined location of the robotic arm 21 is dependent on the location of the pattern 15 on the display and reveals where that pattern is located. If the pattern 15 has not been detected 315, the location of the robotic arm 21 may be moved 307 to another location and the above procedure may be repeated. When the location of each pattern 15 has been found out 322, the testing apparatus 1 is aware of the locations of the patterns 15 within the area 17 on the test bench. If each pattern 15 is shown at one corner of the display 14 of the device 13, the location and orientation (i.e. pose) of the display 14 of the device 13 is known 324 by the testing apparatus 1. The testing apparatus 1 may then use 326 this information and the offset between the touch pin 9 and the camera 4 when it performs tests on the display 14 of the device 13. For example, the touch pin 9 may be used to imitate finger pressings on the display 14.

In accordance with an embodiment, movements of the robotic arm 21 may not be needed but one or more patterns may be moved to another location on the display 14 until the camera 4 detects the pattern. Additionally or alternatively, a plurality of different patterns may be displayed by the display, wherein if the camera 14 sees any of these patterns the shape, color and/or any other identifiable information of the pattern may indicate which pattern the camera is seeing and this information may be used to reveal the location of the pattern. This procedure may require that the testing apparatus is aware of the patterns and locations where they should be displayed.

To improve the accuracy of the location detection described above the location of the camera 4 may be slightly adjusted so that the pattern is in the middle of the viewing area of the camera 4. At this area possible distortions of the camera optics may be smaller than at the edges of the viewing area of the camera 4.

Figure 4:
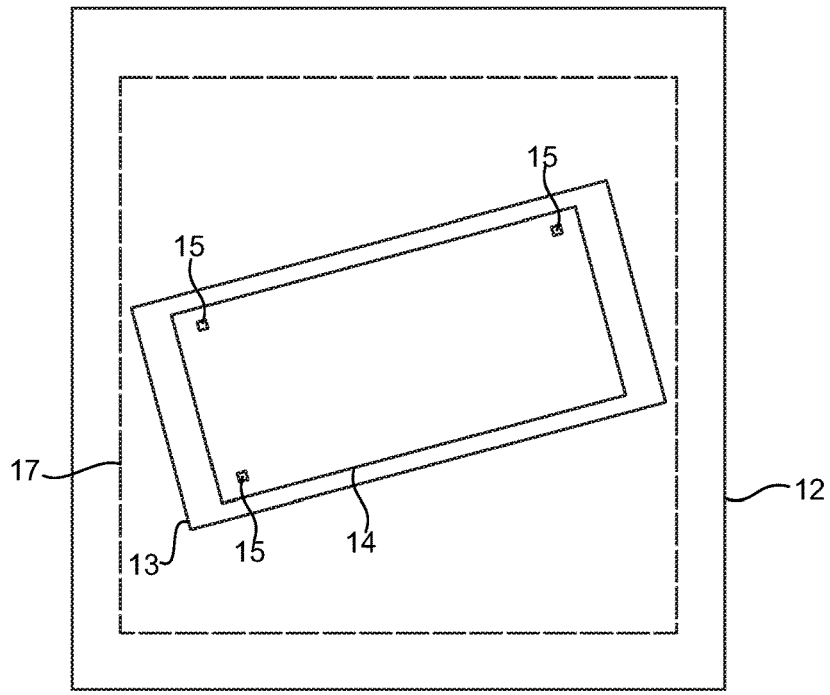
FIG. 4 depicts an example of a display showing coded patterns for testing.

In accordance with another embodiment the patterns 15 are shown at an offset from the corners of the display 14, wherein the testing apparatus 1 is informed on the offsets of each pattern so that the testing apparatus 1 may use the detected locations of the patterns 15 and the offsets to find out the location of actual corners of the display 14 of the device 13. This is illustrated in FIG. 4. For example, each pattern 15 may be at a distance of 10 pixels from the corner in x- and y-directions. Although in this example the offsets were in relation to the corners of the display, they may be in relation to other reference location(s) of the display instead, wherein the testing apparatus 1 is aware of the reference location(s). As a non-limiting example, one or more of the reference locations may be in a middle of an edge of the display and/or one reference location may be in a center of the display.

In an implementation in which one or a few optical fibers 10 are used, the opto-electric converter 11 may be used to detect when the first end 10a of the optical fiber 10 is above the pattern 15. It may be detected on the basis of the signal produced by the opto-electric converter 11. When the signal has a significant change, e.g. a voltage produced by the opto-electric converter 11 changes more than a predetermined threshold, the image analyzer 2a may deduce that the first end 10a of the fiber 10 is above one of the patterns 15. Hence, the control block 2 may use the location of the robotic arm 21 at that moment to determine the location of the pattern 15 similarly than the camera example presented above. When enough number of patterns 15 have been located the location and orientation of the device 13 can be determined. Usually detection of three patterns 15 is sufficient but in some embodiments detection of four patterns or even more than four patterns may be needed e.g. when the display is not of a rectangular shape.

The shape of the pattern 15 may vary in different implementations. For example, it may be sufficient that the pattern 15 is formed by illuminating one pixel at each location where such pattern 15 should be located. The color of each pattern 15 may be the same or the color of two or more patterns 15 may differ from each other. In the latter case the color of the pattern 15 may be used to indicate the location of the pattern. As an example, a pattern at a top-left corner of the display 14 may illuminate red light, a pattern at a bottom-left corner of the display 14 may illuminate green light, and a pattern at a bottom-right corner of the display 14 may illuminate blue light. On the other hand, the patterns 15 may be formed by illuminating two or more pixels for example in such a way that these pixels form a square, a rectangle, a circle, two lines crossing each other or another form. Hence, when such a pattern has been found by the camera 4, a pattern recognition algorithm may be used by the image analyzer 2a to find out a predetermined point of the pattern 15, such as a center point or a corner point. This point may then be used as a location reference of the pattern.

In the above it was assumed that the patterns 15 are quite simple patterns which do not carry much information themselves, perhaps only the form and/or the color of the pattern 15 may provide some further information in addition to the location of the pattern. In accordance with a further development, more complicated patterns 15 may be used. Some non-limiting examples of such patterns are two-dimensionally coded patterns 16 in which the content of the pattern 15 depends at least partly on information included in the pattern 15. Such coded patterns may be called as AR markers (Augmented Reality) which may have information encoded one- or two-dimensionally. A so-called QR code (Quick Response) is an example of a two-dimensionally coded pattern, but also other coded patterns may be used with the present invention, such as FIGS. 7a to 7c show some non-limiting examples of QR codes. Some other, non-limiting examples of two-dimensionally coded patterns are DataMatrix and PDF417. As a further note, the coded patterns may also have over forms such as circular or elliptic. The QR code comprises one or more alignment sections 702 and an information section 704. The alignment sections 702 can be used to help a reading apparatus to find out the location and orientation of the QR code and to focus correctly to be able to properly read the QR code for further analysis. The alignment sections 702 may also be used to find out the pose of the device. Hence, it may be sufficient to find out one QR code. The information section 704 comprises information encoded in a form of patterns. The patterns are, for example, small squares having either a first color or a second color. In accordance with an embodiment the first color is white and the second color is black but also other color combinations may be used. It should be noted that it may happen that some devices show the first color and the second color in a different way depending on the properties of the display. Some displays may be able to produce only two colors such as black and white or black and green wherein the first color is one of the two colors and the second color is the other of the two colors.

Figure 8:
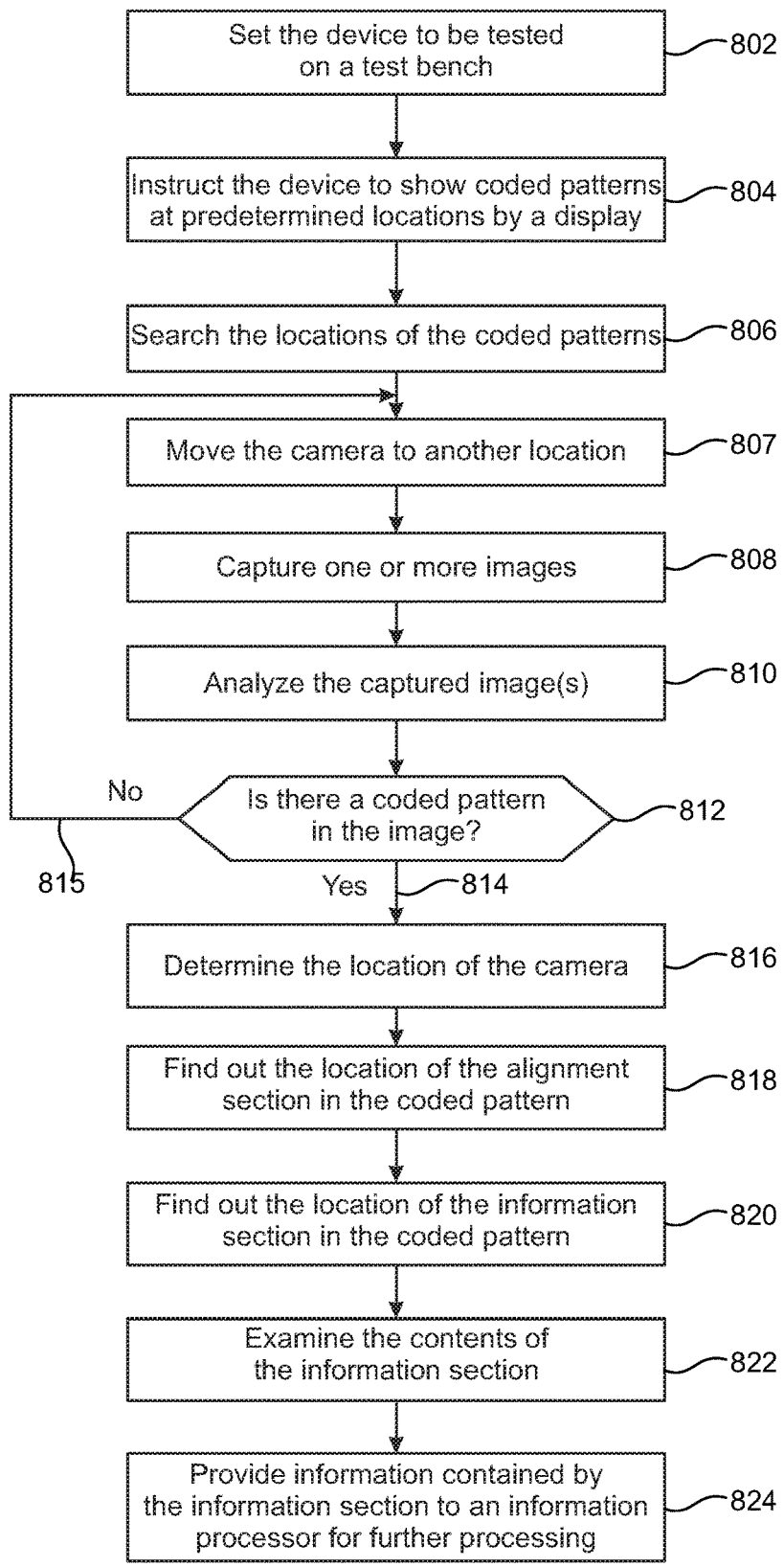
FIG. 8 shows a flow diagram of a method according to another example embodiment.

In the following, an embodiment of a camera assisted alignment detection utilizing coded patterns 16 will be described in more detail with reference to the testing setup depicted in FIG. 6, examples of two-dimensional codes depicted in FIGS. 7a to 7c and the flow diagram of FIG. 8. The device 13 to be tested is set 802 on a test bench 12. It is assumed also here that it is not necessary to accurately put the device 13 in a certain location but it may be sufficient that the device is within a certain area 17. The device 13 may then be instructed 804 to show certain coded patterns 16 at predefined locations by a display 14 of the device 13. The coded patterns 16 are displayed, for example, at least on three locations of the display 14 as is illustrated in FIG. 6. The testing apparatus is instructed to search 806 the locations of the coded patterns 16 basically in the same way than was described above with reference to FIGS. 3 and 5. While the robotic arm 21 is moved 807 the camera 4 captures 808 images. The image analyzer 2a may analyze 810 the captured images and determine 812 whether an image shows any of the coded patterns 16 or not. If the coded pattern 16 has not been detected 814, the location of the robotic arm 21 may be amended 815. If the coded pattern 16 has been detected 814, the location of the robotic arm 21 is determined 816. Furthermore, a code decoder 2c analyzes the coded pattern and finds out 818 where the alignment sections 702 are located. This information may then be used to determine 820 the location of the information section 704. When the location of the information section 704 has been found, contents of the information section 704 can be examined 822 by an information decoder 2d to find out, what information has been encoded into the information section 704 of the coded pattern 16. The information decoded by the information decoder 2d may be provided 824 to an information processor 2e for further processing.

In the following some non-limiting examples about further processing of the information of the information section 704 will be described in more detail. It should be noted here that the coded pattern 16 may comprise one or more of the examples presented below, unless otherwise expressed. The information section 704 may comprise coordinates or other location data of the coded pattern 16 wherein the location data may be used to determine where the coded pattern 16 is located. The information section 704 may also comprise information regarding the device under test, such as a mark, a model, an identifier of the device under test, resolution and/or size of the display of the device, software version, size of the device, size of the display, etc. One or more of the coded patterns 16 may also comprise information on a location of one or more of the other coded patterns 16 presented by the display. It may also be possible to determine the location of the other coded patterns 16 by using information of the location of the already found coded pattern 16 and the size of the display revealed by the found coded pattern 16.

The coded pattern 16 may also indicate which testing procedure should be performed with the current device under test and/or provide information how and/or which tests should be performed with the current device. If a testing procedure initiated in the device does not correspond with the testing procedure indicated by the coded pattern 16, an indication may be provided to the testing personnel and/or the device may try to load and initiate a correct testing procedure/testing configuration.

One purpose of the additional information encoded into the coded pattern(s) 16 is to speed up the testing procedure because the information may help the testing apparatus to locate the device, locate other coded patterns 16 on the display, etc.

Testing results may be linked with the device under test e.g. so that the testing results are stored together with identification information of the device under test and stored into a storage location such as a server in a communication network (not shown). Hence, the testing results may be retrieved at a later stage from the storage location and possibly compared with results obtained by a new test run, for example.

In accordance with an embodiment, a part of the coded patterns 16, e.g. one coded pattern 16, may be larger than other coded patterns and may contain more information than the smaller coded patterns 16. Such larger coded pattern 16 may then contain, for example, information of the device, information of the tests to be performed etc., whereas the smaller coded patterns 16 may only contain information of the location of these coded patterns 16.

The testing apparatus 1 or some other element of a testing environment may produce an image comprising the coded patterns 16, wherein the testing apparatus 1 or the device may request the image from a storage location and the requested image may then be sent to the device under test and the device may display the image on the display. Hence, the device need not produce the coded patterns 16 but it may suffice that the device is able to display the image.

In accordance with an embodiment, the image and/or the coded patterns 16 may have been embedded into a software of the device. In this case the image or the coded patterns 16 may be produced on the display by using the information stored into the software of the device. The software may comprise coded sequences for reading information of the coded patterns from the software and displaying them on the display.

The above mentioned image which comprises coded patterns 16 may be printed on a paper and the paper may be attached with a test bench wherein the testing apparatus 1 may examine the image to locate it.

It may also be possible to implement the coded patterns 16 in such a way that one or more of the coded patterns 16 presented on the display may be amended during the testing. For example, when a finger or the touch pin 9 touches the display 14 (or actually a touch panel on the surface of the display 14), the coded pattern 16 may provide information of the location of the touch, a force which the touch effected on the touch panel, etc. determined by the device under test. Hence, the testing apparatus 1 may, for example, compare the actual location and/or force with the location and/or force detected by the device under test to determine whether there is an error in the touch detection operation of the device and how big that error might be. In accordance with an embodiment, this information may be used by the testing apparatus 1 to make corrections to the touch detection operation of the device, or the testing apparatus 1 may indicate to testing personnel that the touch detection operation of the device should be corrected.

In accordance with an embodiment, one or more of the coded patterns 16 may be arranged to follow the testing probe 3 when the testing probe 3 is moved for example so that one coded pattern 16 is displayed at the location of the testing probe 3.

The coded pattern 16 or a part of it, for example the alignment section(s) 702 may be used to find out the distance between the touch pin 9 and the surface of the display 14 or touch panel of the device. This may be performed e.g. so that the distance of the camera 4 with respect to the surface of the display 14 is changed i.e. the camera is moved in a direction perpendicular to the surface of the display 14, until the best focus (sharpest image) has been obtained. That distance may then be used to determine the actual distance between the touch pin 9 and the surface of the display 14 provided that the offset between the camera 4 and the touch pin 9 is known and does not change when the camera 4 is moved in the direction perpendicular to the surface of the display 14.

Information encoded into QR codes may have different formats such as text or json, but also other formats and/or coded patterns may be used.

In the above the alignment detection was performed with respect of a display, but the invention may also be implemented to detect alignment of an object using other means for providing the visual information of the patterns. For example, the patterns may be printed on a paper and this paper may then be attached with the object.

The patterns may also be presented as an image in an image gallery so that it may not affect to the operations of the device. In other words, the device need not have software for producing the patterns on certain locations but only display the image comprising the patterns.

The image shown by the display may contain more than one objects, which the testing apparatus may detect and find out the alignment of these objects at once, or the testing apparatus may detect and find out the alignment of a subset of these objects (e.g. only one object) at once.

In accordance with an embodiment, the display may show an identifier of the device wherein that information may be used to decide how to operate the device.

In the following some examples will be provided.

According to a first example, there is provided a method comprising:

instructing a device under test to display at least one pattern on a display of the device;
capturing at least one image of the display;
examining the captured image to find out a location of the at least one pattern;
utilizing information on the location of the at least one pattern to determine a pose of the device.

In accordance with an embodiment, the method comprises:

searching the at least one pattern from the captured image;
if at least one pattern has been found, determining the location of the found pattern in the image; and
using the location of the found pattern to determine a location of a location of a reference location of the display.

In accordance with an embodiment the reference location is one of a corner of the display; a center of the display; a midpoint of an edge of the display.

In accordance with an embodiment, the method comprises:

searching at least a first pattern, a second pattern and a third pattern from the captured image;
if the first pattern, the second pattern and the third pattern has been found, determining the location of the first pattern, the second pattern and the third pattern in the image;
using the locations of the first pattern, the second pattern and the third pattern to determine a location of three corners of the display; and
using the location of the three corners to determine the pose of the device.

In accordance with an embodiment, the method comprises:

using a coded pattern as said one pattern.

In accordance with an embodiment, the coded pattern is two-dimensionally coded pattern.

In accordance with an embodiment, the method comprises:

decoding information of the coded pattern;
using the decoded information to find out one or more of the following:
location data of the coded pattern;
a mark of the device;
a model of the device;
an identifier of the device;
resolution of the display of the device;
size of the display of the device;
software version of the device;
location of one or more of the other coded patterns presented by the display;
indication of a testing procedure to be applied to the device.

According to a second example there is provided an apparatus for testing a device, the apparatus comprising at least one processor; and at least one memory including computer program code the at least one memory and the computer program code configured to, with the at least one processor, cause the apparatus to perform at least the following:

instruct a device under test to display at least one pattern on a display of the device;
capture at least one image of the display;
examine the captured image to find out a location of the at least one pattern;
utilize information on the location of the at least one pattern to determine a pose of the device.

In accordance with an embodiment, the apparatus comprises computer program code configured to, with the at least one processor, cause the apparatus to:

search at least a first pattern, a second pattern and a third pattern from the captured image;
if the first pattern, the second pattern and the third pattern has been found, determine the location of the first pattern, the second pattern and the third pattern in the image;
use the locations of the first pattern, the second pattern and the third pattern to determine a location of three corners of the display; and
use the location of the three corners to determine the pose of the device.

In accordance with an embodiment, the apparatus comprises computer program code configured to, with the at least one processor, cause the apparatus to:

search at least a coded pattern from the captured image;
analyze the coded pattern to find out a location of an alignment section in the coded pattern;
use the location and direction of the alignment section to determine the pose of the device.

In accordance with an embodiment, the apparatus comprises computer program code configured to, with the at least one processor, cause the apparatus to:

search at least a coded pattern from the captured image;
analyze the coded pattern to find out a location of an information section in the coded pattern;
decode information encoded in the information section; and
use the decoded information to determine at least one of:
the pose of the device;
identification information of the device;
location of the coded pattern on the display;
information on a testing procedure to be performed.

According to a third example there is provided a computer readable storage medium stored with code thereon for use by an apparatus, which when executed by a processor, causes the apparatus to perform:

instruct a device under test to display at least one pattern on a display of the device;
capture at least one image of the display;
examine the captured image to find out a location of the at least one pattern;
utilize information on the location of the at least one pattern to determine a pose of the device.

We claim:
1. A method for determining a location of a device under test on a test bench, the method comprising:

instructing the device to display at least one pattern on a display of the device;
capturing by an optical element of a testing probe of the testing apparatus at least one image of the display;
examining the captured image to determine whether the image includes said at least one pattern;
determining the location of the testing probe when the at least one pattern has been detected;
using information on the determined location of the testing probe to determine a location of the at least one pattern in the display; and
utilizing information on the location of the at least one pattern to determine a pose of the device under test on the test bench, wherein examining the captured image comprises searching the pattern by moving both the testing probe and the optical element attached with the testing probe for capturing the image.

2. The method according to claim 1 comprising:
searching the at least one pattern from the captured image;
if at least one pattern has been found, determining the location of the found pattern in the image; and
using the location of the found pattern to determine a location of a reference location of the display.

3. The method according to claim 2 comprising:
using at least one of the following locations as said reference location:
a corner of the display;
a center of the display;
a midpoint of an edge of the display.

4. The method according to claim 1 comprising:
searching at least a first pattern, a second pattern and a third pattern from the captured image;
if the first pattern, the second pattern and the third pattern has been found, determining the location of the first pattern, the second pattern and the third pattern in the image;
using the locations of the first pattern, the second pattern and the third pattern to determine a location of three corners of the display; and
using the location of the three corners to determine the pose of the device.

5. The method according to claim 1 comprising:
using a coded pattern as said at least one pattern.

6. The method according to claim 5, wherein the coded pattern is two-dimensionally coded pattern.

7. The method according to claim 4 comprising:
decoding information of the coded pattern;
using the decoded information to find out one or more of the following:
location data of the coded pattern;
a mark of the device;
a model of the device;
an identifier of the device;
resolution of the display of the device;
size of the display of the device;
software version of the device;
location of one or more of the other coded patterns presented by the display;
indication of a testing procedure to be applied to the device.

8. The method according to claim 6, wherein said two-dimensionally coded pattern is one of QR code, DataMatrix code or PDF417 code.

9. The method according to claim 1, wherein the at least one pattern is at least one of:
computer code for forming the at least one pattern on the display;
an image to be shown on the display;
a pattern printed on a paper and attached on the device.

10. An apparatus for testing a device under test on a test bench, the apparatus comprising at least one processor; and at least one memory including computer program code the at least one memory and the computer program code configured to, with the at least one processor, cause the apparatus to perform at least the following:
instruct the device under test to display at least one pattern on a display of the device;
capture by an optical element of a testing probe of the apparatus at least one image of the display;
examine the captured image to determine whether the image includes said at least one pattern;
determining the location of the testing probe when the at least one pattern has been detected;
using information on the determined location of the testing probe to determine a location of the at least one pattern in the display by searching the pattern by moving both the testing probe and the optical element attached with the testing probe for capturing the image;
utilize information on the location of the at least one pattern to determine a pose of the device under test on the test bench.

11. The apparatus according to claim 10 further comprising computer program code configured to, with the at least one processor, cause the apparatus to:
search at least a first pattern, a second pattern and a third pattern from the captured image;
if the first pattern, the second pattern and the third pattern has been found, determine the location of the first pattern, the second pattern and the third pattern in the image;
use the locations of the first pattern, the second pattern and the third pattern to determine a location of three corners of the display; and
use the location of the three corners to determine the pose of the device.

12. The apparatus according to claim 10 further comprising computer program code configured to, with the at least one processor, cause the apparatus to:
search at least a coded pattern from the captured image;
analyze the coded pattern to find out a location of an alignment section in the coded pattern;
use the location and direction of the alignment section to determine the pose of the device.

13. The apparatus according to claim 10 further comprising computer program code configured to, with the at least one processor, cause the apparatus to:
search at least a coded pattern from the captured image;
analyze the coded pattern to find out a location of an information section in the coded pattern;
decode information encoded in the information section; and
use the decoded information to determine at least one of:
the pose of the device;
identification information of the device;
location of the coded pattern on the display;
information on a testing procedure to be performed.

14. A non-transitory computer readable storage medium stored with code thereon for use by an apparatus, which when executed by a processor, causes the apparatus to perform:
instruct a device under test on a test bench to display at least one pattern on a display of the device;
capture by an optical element of a testing probe of the apparatus at least one image of the display;

examine the captured image to determine whether the image includes said at least one pattern;

determining the location of the testing probe when the at least one pattern has been detected:

using information on the determined location of the testing probe to determine a location of the at least one pattern in the display by searching the pattern by moving both the testing probe and the optical element attached with the testing probe for capturing the image;

utilize information on the location of the at least one pattern to determine a pose of the device under test on the test bench.

\* \* \* \* \*